United States Patent
Hodil, Jr. et al.

(10) Patent No.: US 6,474,530 B1
(45) Date of Patent: Nov. 5, 2002

(54) ADAPTOR ASSEMBLY FOR INTERCHANGEABLY MOUNTING HOT AIR SOLDER REFLOW NOZZLES TO SOLDERING/DESOLDERING APPARATUS

(75) Inventors: Elmer Raleigh Hodil, Jr., Timonium; William J. Siegel, N. Bethesda; Anthony Qingzhong Tang, Ellicott City; Robert S. Quasney, Pasadena, all of MD (US)

(73) Assignee: Pace, Incorporated, Laurel, MD (US)

( * ) Notice: Subject to any disclaimer, the term of this patent is extended or adjusted under 35 U.S.C. 154(b) by 0 days.

(21) Appl. No.: 08/802,677

(22) Filed: Feb. 19, 1997

(51) Int. Cl.[7] .......................... B23K 1/00; B23K 20/14; B23K 5/00
(52) U.S. Cl. ........................ 228/42; 228/92; 228/234.1; 228/218; 228/219
(58) Field of Search .................. 228/92, 42, 234.1, 228/218, 219; 219/228, 227; 239/600, 601

(56) References Cited

U.S. PATENT DOCUMENTS

| | | |
|---|---|---|
| 4,295,596 A | * 10/1981 | Doten et al. ............ 228/180 A |
| 4,497,427 A | 2/1985 | Fortune |
| 4,686,737 A | 8/1987 | Fortune |
| 4,899,920 A | 2/1990 | Abbagnaro et al. |
| 4,972,990 A | 11/1990 | Abbagnaro et al. |
| 5,054,106 A | 10/1991 | Fortune |
| 5,785,237 A | * 7/1998 | Lasto et al. ............ 228/180.22 |

* cited by examiner

*Primary Examiner*—M. Alexandra Elve
(74) *Attorney, Agent, or Firm*—Nixon Peabody LLP; David S. Safran

(57) ABSTRACT

Handheld and stationary hot air solder reflow apparatus for repairing, reworking or producing electronic components and circuit boards of the type having a means for supplying a flow of hot air to an outlet tube are provided with a nozzle adaptor which has an internal adapter body which is resiliently carries a support collar which is held in an axial direction relative to the internal body by a spring. A bezel ring having a plurality of receiving tabs is mounted in the support collar, the tabs on the bezel ring in the support collar engage tabs on a mounting plate of each nozzle assembly, causing compression of the spring and resulting in a clamping of the mounting plate between a bottom surface of the internal body and the bezel ring.

12 Claims, 7 Drawing Sheets

ADAPTOR ASSEMBLY FOR INTERCHANGEABLY MOUNTING HOT AIR SOLDER REFLOW NOZZLES TO SOLDERING/DESOLDERING APPARATUS

BACKGROUND OF THE INVENTION

1. Field of the Invention

The present invention relates to apparatus used for the repairing, reworking and/or production of electronic components and circuit boards and which use a flow of hot air to re-melt solder retaining the electronic components on a substrate, such as a circuit board. More specifically, the present invention relates to adapters as are used to interchangeably mount various different nozzles to such apparatus.

2. Description of Related Art

In apparatus used for the repairing, reworking and/or production of electronic components and circuit boards, nozzles are used to direct and confine the flow of hot air, used to re-melt solder retaining the electronic components on a circuit board, so that all of the solder connections can be heated simultaneously. However, since electronic components differ widely in size, a different nozzle is needed for each component. Thus, it is necessary for the nozzle of such apparatus to be mounted in a manner which enables it to be exchanged with various other nozzles.

U.S. Pat. Nos. 4,972,990 and 4,899,920 to Abbagnaro et al. disclose an apparatus for removal and installation of electronic components on a substrate, such as a printed circuit board, which has a heater assembly with a plurality of locking pins which serve to retain a nozzle base in position against a bottom end of the heater assembly. A pair of locating pins act in cooperation with one another to secure the nozzle base to the heater assembly by operation of a shear handle. This apparatus is large and is designed to be stationarily placed on a table top or other work surface. In this context, the indicated means by which nozzles are attached and detached is size satisfactory. However, because of the size and number of components which are used and the need to use two hands to mount an dismount a nozzle, such the disclosed nozzle attachment/detachment arrangement is not suitable for apparatus having a handheld instrument for applying hot air for producing solder reflow.

U.S. Pat. No. 5,054,106 to Fortune shows a hot gas soldering system with a handheld instrument for applying hot gas for producing solder reflow. Tips and nozzles of various types and configurations have a nut portion that can be threaded onto the end of the instrument, or in one embodiment, a nut with spring fingers having an inwardly directed retaining shoulder is used to a retain a soldering tip. Other exchangeable tip assemblies for soldering/desoldering tools are shown in Fortune's U.S. Pat. Nos. 4,686,737 and 4,497,427, the latter mentioned patent also uses a threaded nut as a tip housing, while the former discloses the use of annular ridges or threads on an outer surface of a body portion of a removable end cap for retaining various tips or nozzles on the end of a handheld desoldering tool. However, such attachment arrangements make it difficult to maintain the correct radial position of the tip under both cold and hot conditions. In the case of an annular retaining shoulder, the tip is able to shift radially and is always free to rotate, so that maintaining a set position is impossible. On the other hand, with a threaded connection, only one radial position is possible and manufacturing of all nozzles accurately enough to achieve the same relative position is expensive. Moreover, threads can bind easily as a result of thermal cycling.

Thus, there is still a need for an arrangement by which a variety of different nozzles can be quickly and easily be mounted/dismounted to/from apparatus of the type using hot air for soldering/desoldering connections of electrical components for installation and removal thereof with respect to a substrate, such as a printed circuit board. In particular, there is a need for such an arrangement that can be easily and economically produced, and is suitable for use on handheld tools, not merely stationary apparatus.

SUMMARY OF THE INVENTION

In view of the foregoing, a primary object of the present invention is to provide an adapter assembly suitable for interchangeably mounting various different nozzles to apparatus which use a flow of hot air to re-melt solder retaining electronic components on a substrate, such as a circuit board, for repairing, reworking and/or production thereof.

More specifically, it is an object of the present invention to obtain foregoing object in a manner applicable to both stationary and handheld heat applying units.

Yet another object is to attain the above objects in a manner that can be easily and economically produced.

Still another object of the present invention is to provide an adapter suitable for interchangeably mounting various different nozzles to apparatus of the noted type that is easy to use, yet assures proper positioning of the nozzles relative to the heater head, and thus, with reference to the component being worked on.

These and other objects of the invention are obtained via a nozzle adaptor which has an internal adapter body which resiliently carries a support collar which is held in an axial direction relative to the internal body by a spring. A bezel ring having a plurality of receiving tabs is mounted in the support collar, the tabs on the bezel ring in the support collar engage tabs on a mounting plate of each nozzle assembly, causing compression of the spring and resulting in a clamping of the mounting plate between a bottom surface of the internal body and the bezel ring.

These and further objects, features and advantages of the present invention will become apparent from the following description when taken in connection with the accompanying drawings which, for purposes of illustration only, a single embodiment in accordance with the present invention.

DETAILED DESCRIPTION OF THE PREFERRED EMBODIMENT

Figure 1:
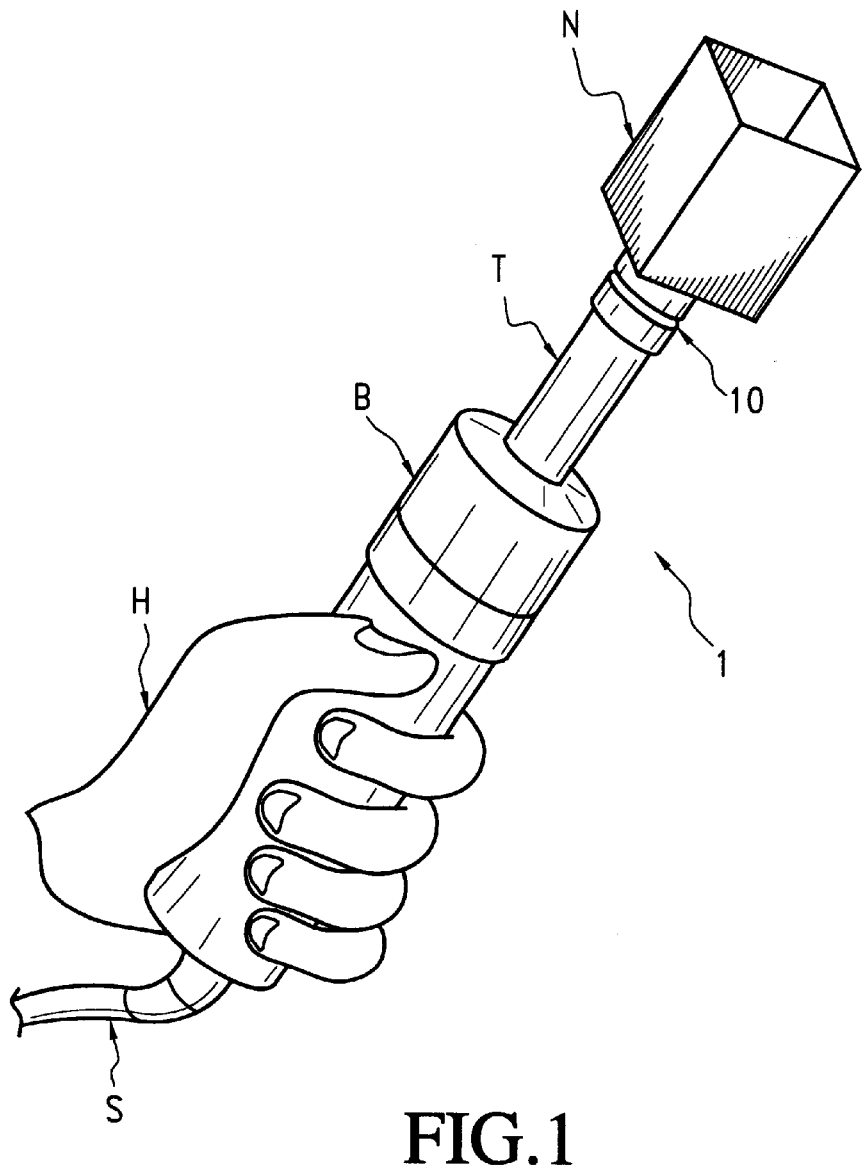
FIG. 1 is a perspective view of a handheld hot air, solder reflow apparatus for repairing, reworking and/or production of electrical components having the nozzle adapter assembly of the present invention.
Figure 2:
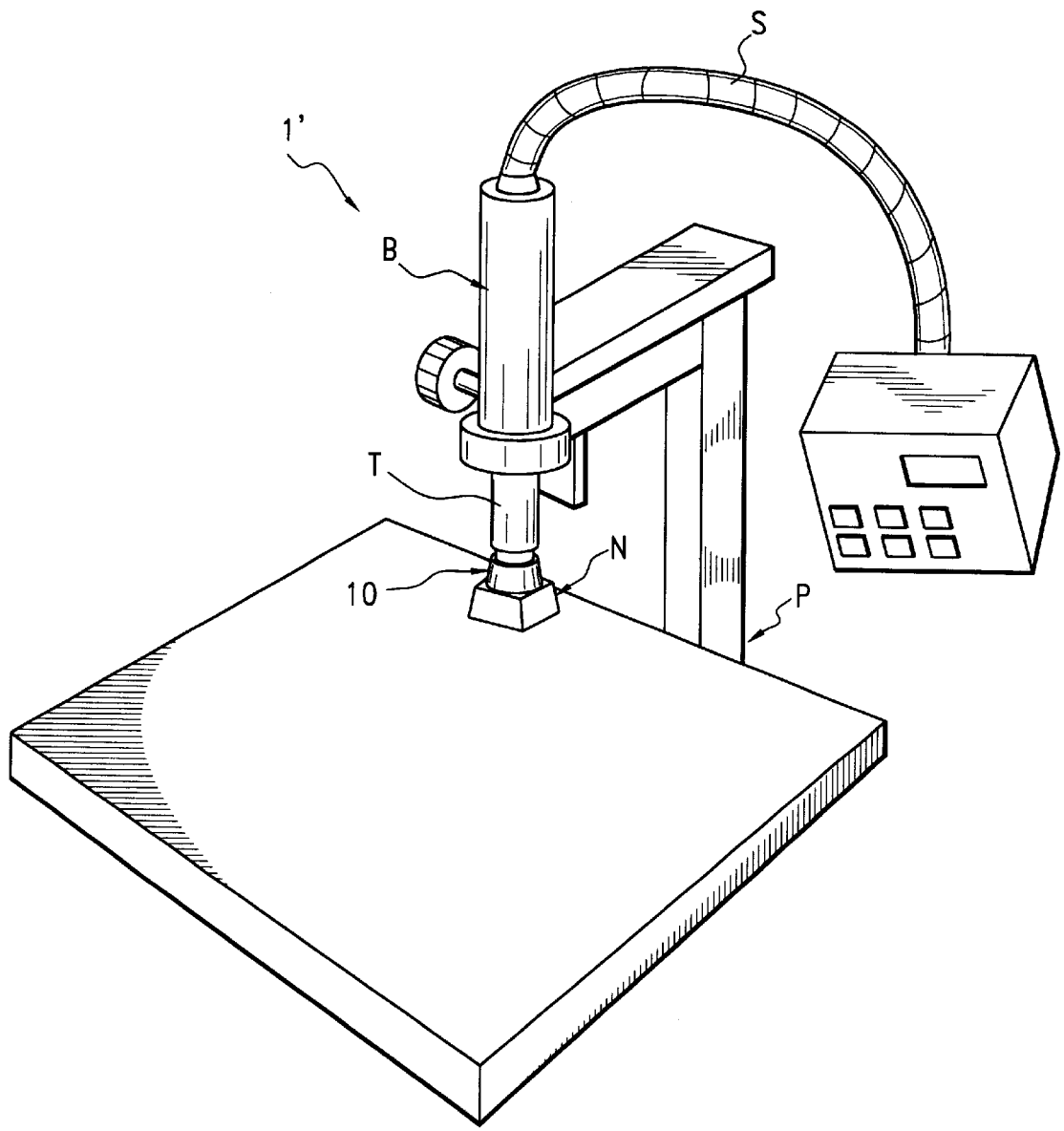
FIG. 2 is a perspective view of a stationary hot air, solder reflow apparatus for repairing, reworking and/or production of electrical components having the nozzle adapter assembly of the present invention.
Figure 3:
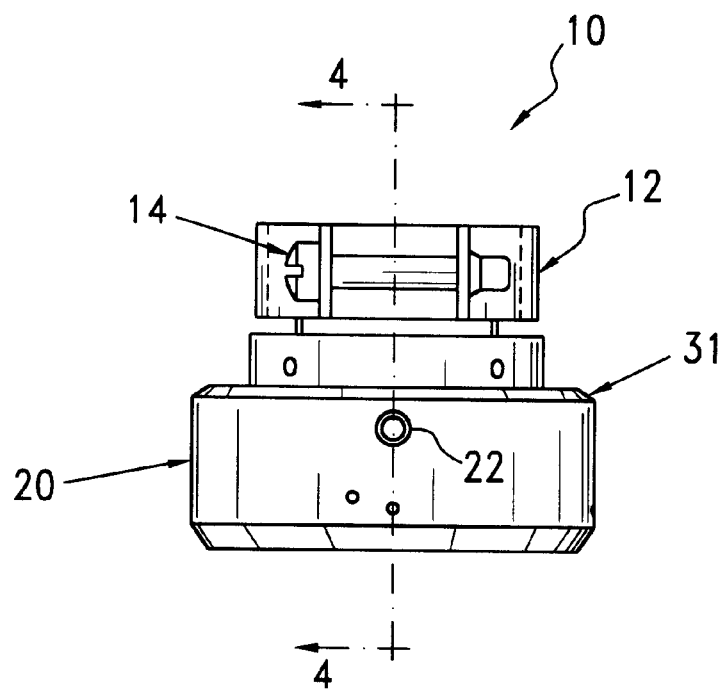
FIG. 3 is a side elevational view of the nozzle adapter assembly of the present invention.

FIGS. 1 & 2 show, respectively, handheld and stationary hot air solder reflow apparatus 1, 1' of the type used for soldering/desoldering of electrical components with respect to a substrate, such as a printed circuit board. Such apparatus, typically, have a body portion B that is either held by the hand H of the user or mounted to a stationary pedestal P is connected at one end to a supply line S by which heated or unheated air is delivered thereto. The air passes through the body B to an outlet tube T (where the air, if unheated, is heated by a heating element within tube T) and into an air nozzle N, the nozzle N being positioned around an electrical component that is to be solder/desoldered to/from a substrate as is conventional for the repairing, reworking and production electrical devices. As mentioned initially, since electronic components differ widely in size and shape, a different nozzle is needed for each size/shape component. Thus, it is necessary for the nozzle of such apparatus to be mounted in a manner which enables it to be exchanged with various other nozzles. To this end, the nozzle adaptor 10 shown in FIG. 3 has been developed by the present applicants for attaching and detaching nozzles to the tube T of apparatus of the type shown in FIGS. 1 & 2. The adapter 10 is fixed to the air tube T by a clamp portion 11 which is similar to conventional hose clamps, having an annular band 12 of, e.g., spring metal, which is slid onto the tube T of the soldering/desoldering apparatus 1, 1', and then is secured in place on the tube T by tightening of a screw 14 which draws opposite ends of the band 12 together.

Figure 10:
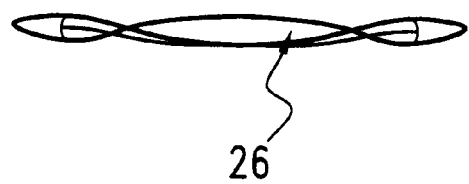
FIG. 10 is a side view of a wave spring of the FIG. 3 nozzle adapter assembly.
Figure 4:
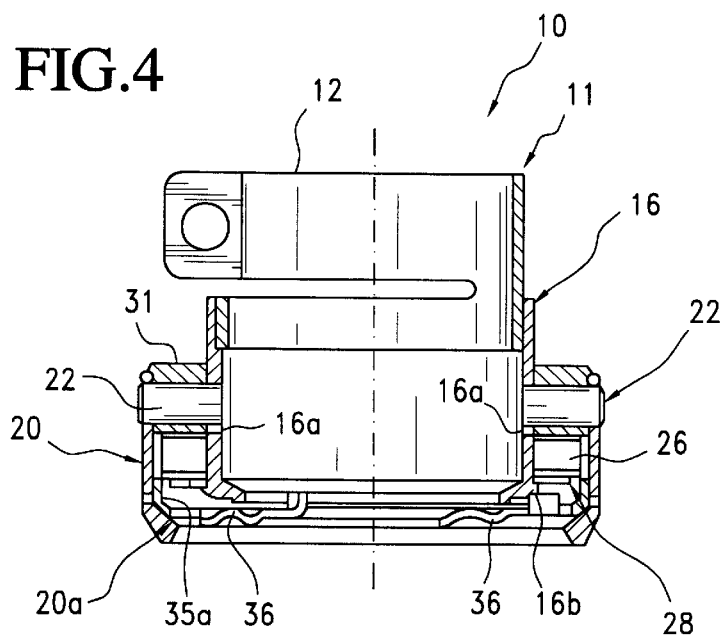
FIG. 4 is an enlarged cross-sectional view of the nozzle adapter assembly taken along line 4—4 in FIG. 3.
Figure 5:
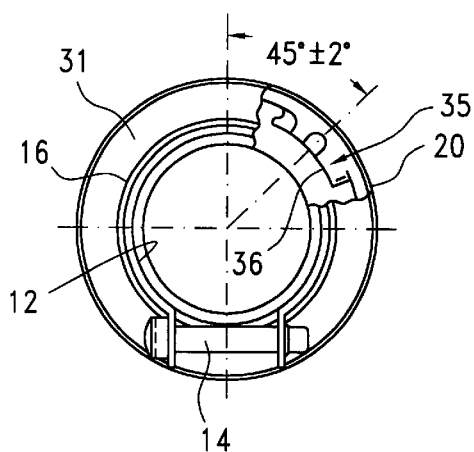
FIG. 5 is a partially broken away top plan view of the nozzle adapter assembly of FIG. 3.
Figure 6:
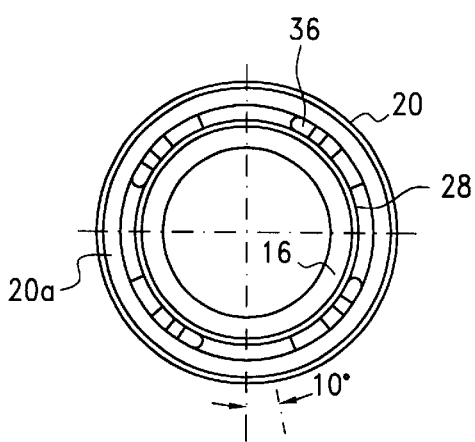
FIG. 6 is a bottom plan view of the nozzle adapter assembly shown in FIG. 3.
Figure 7:
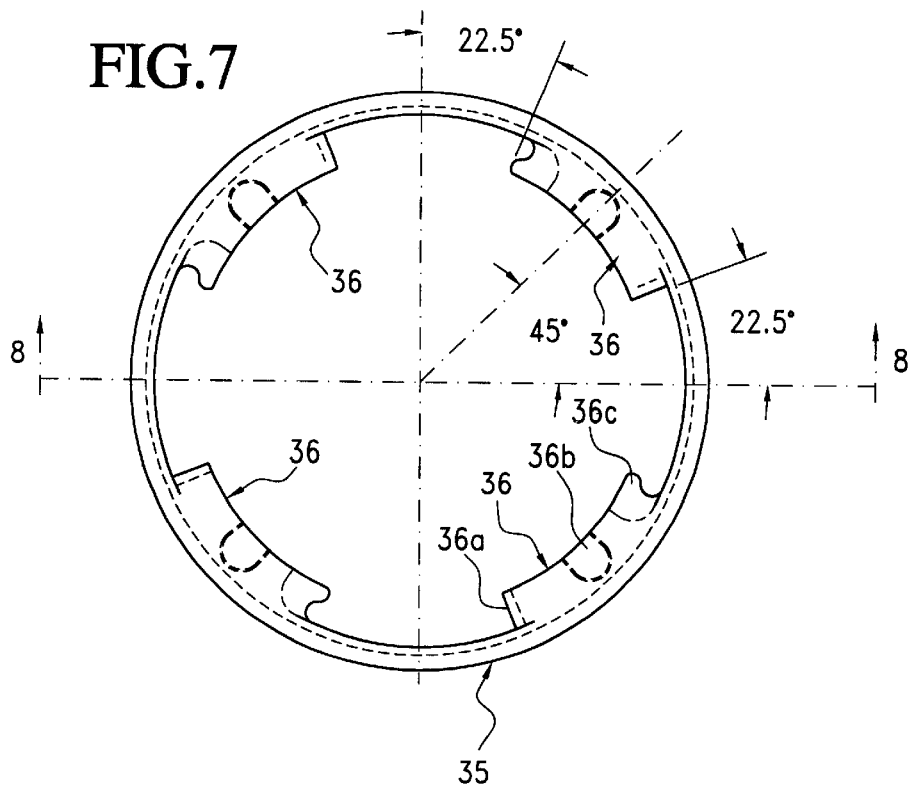
FIG. 7 is a bottom plan view of a bezel ring of the FIG. 3 nozzle adapter assembly.
Figure 8:
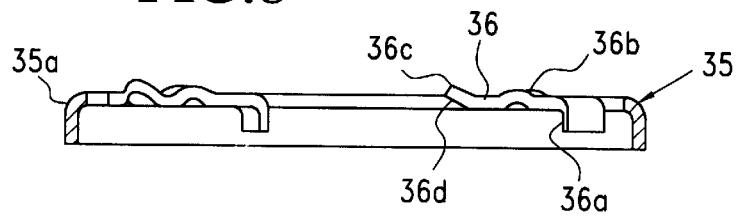
FIG. 8 is a cross-sectional view of a bezel ring taken along line 8—8 in FIG. 7, inverted from its orientation in FIG. 4.
Figure 9:
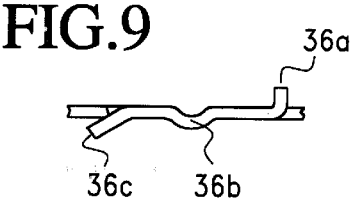
FIG. 9 is a partial, inner side elevational view of the FIG. 7 bezel ring showing a single mounting tab thereof.
Figure 11:
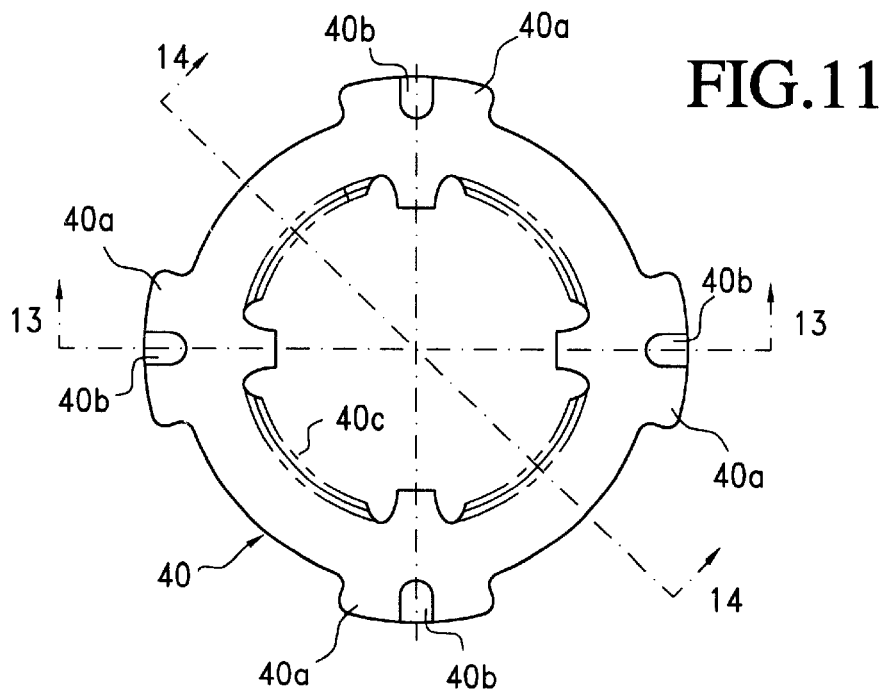
FIG. 11 is a plan view of a mounting plate of the FIG. 11 nozzle.
Figure 12:
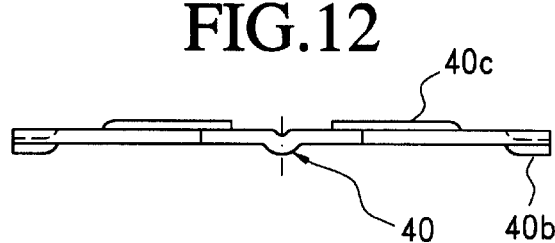
FIG. 12 is a side view of the mounting plate of the FIG. 12.
Figure 13:
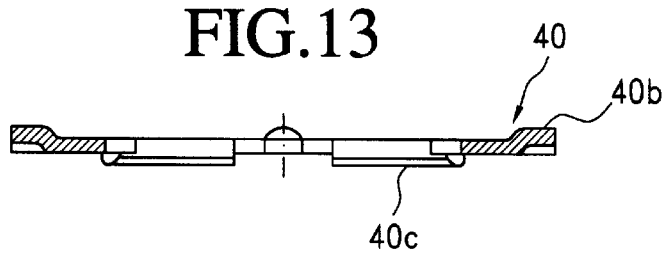
FIG. 13 is a cross-section view of the mounting plate taken along ling 13—13 in FIG. 11.
Figure 14:
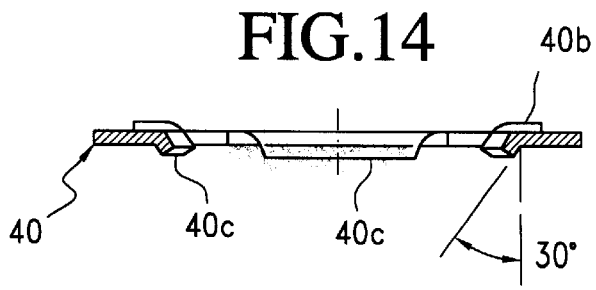
FIG. 14 is a cross-section view of the mounting plate taken along ling 14—14 in FIG. 11.

The clamp portion 11, as shown in FIG. 4, is fixed within the upper end of an internal adapter body 16. The internal adapter body 16 is keyed to an outer support collar 20 by pins 22, the pins being fixed to collar 22 and extending radially into axially elongated slots 16a in the internal adapter body 16, so that limited relative axial sliding of the internal adapter body 16 with respect to the support collar 20 is possible. A wave spring 26 (shown by itself in FIG. 10) is held between a washer 28 (which is carried on a perimetric flange 16b on the body 16) and a ring 31 that is fixed in the upper end of support collar 20. The wave spring 26 pushes the internal adapter body 16 into the support collar 20 until the pins 22 are stopped by ends of the slots 16a in the internal adapter body 16.

A bezel ring 35, having receiving tabs 36 evenly spaced about its inner circumference, is disposed within the supporting collar 20 with the corner 35a of the bezel ring 35 directed toward an inner flange 20a of the supporting collar 20. As so disposed in the supporting collar 20, upper, axially oriented free edges 36a of the tabs 36 contact the underside of washer 28, while coined depressions 36b and lower, angled free edges 36c of the tabs 36 contact the edge of inner flange 20a of the supporting collar 20. The receiving tabs 36 are designed to receive mounting tabs 40a of a mounting plate 40 that is provided on the top side of each nozzle N that is to be interchangeably mountable to the solder reflow apparatus 1, 1'. The mounting tabs 40a have coined ridges 40b that are matched to the coined depressions 36b of the receiving tabs 36. Additionally, the mounting plate 40 has inclined surfaces 40c for engagement with the internal diameter of the internal adaptor body 16.

Figure 15:
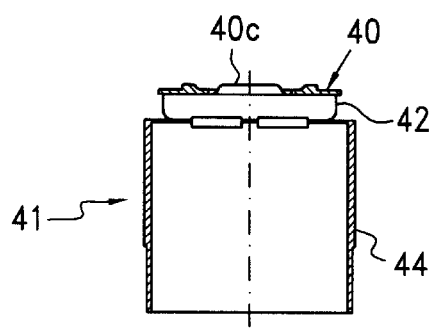
FIGS. 15–18 are each a cross-section view of a respective nozzle in accordance with the present invention.
Figure 16:
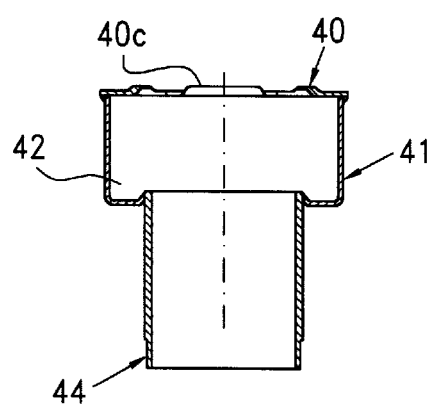
Figure 17:
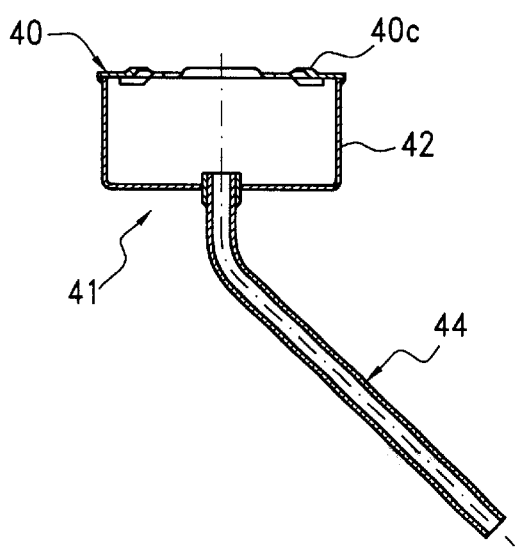
Figure 18:
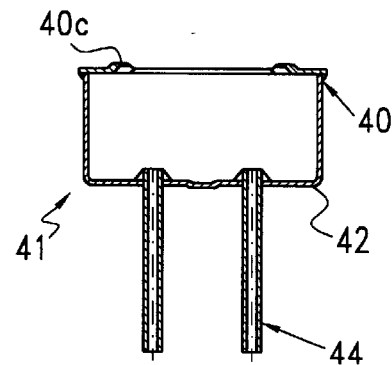

With reference to nozzle assemblies 41 of FIGS. 15–18, it can be seen that, in each case, irrespective of the size or shape of nozzle, the mounting plate 40 is mounted, such as by welding, to the top of an adaptor skirt 42, and the lower side of the adaptor skirt 42 is joined to the nozzle or nozzles 44. By way of example only, FIG. 15 shows a rectangular nozzle 44 that is wider than the mounting plate 40 and skirt 42 to which is connected; FIG. 16 shows a rectangular nozzle 44 that is narrower than the mounting plate 40 and skirt 42 to which is connected; FIG. 17 shows the provision of an angled tubular nozzle 44; and FIG. 18 shows a pair of slot-shaped nozzles being provided. From these examples, it should be apparent how any size or shape of nozzle(s) can be made part of a nozzle assembly 41 in accordance with the present invention, for joining via an adaptor assembly 10 to either a handheld or stationary type soldering and/or desolding device of the hot air reflow type.

For attachment of a nozzle assembly to the adaptor assembly 10, the mounting plate 40 of the nozzle assembly 41 is inserted into the bottom of the adapter assembly 10, so that the face of the mounting plate 40 contacts the bottom of the internal adapter body 16 and the mounting tabs 40a of mounting plate 40 are positioned circumferentially between the receiving tabs 36 of the bezel ring 35. Then, by rotating the nozzle assembly 41, the mounting tabs 40a are moved over the receiving tabs 36 to between the receiving tabs 36 and the bottom of the internal adapter body 16.

As a result the inserted thickness of the mounting plate 40 and the action of the inclined surface of the tabs 40 on an inside diameter of the internal adapter body 16 and of coined ridges 40b of the mounting plate tabs 36 on the bezel ring 36, the bottom of the internal adaptor body 16 and the bezel ring 35 are pushed apart. This causes compression of the wave spring 26 due to resulting upward displacement of the internal adaptor body 16 relative to the supporting collar 20 and pins 22. Thus, a clamping action is produced on the mounting plate 40.

As the mounting plate 40 continues to rotate, the leading edges of the nozzle tabs contact the bends of the bezel ring tabs 36 that produce edges 36a. Simultaneously, the raised ridges 40b on the mounting tabs 40 engage the depressions 36b on the receiving tabs 40. This engagement and clamping action of the spring forms a radial locating detent. Axial location is accomplished when the nozzle tabs 40c engage the inside diameter of the internal adapter body as described above.

Advantages of the above-described invention include:

The nozzle assembly can be engaged and disengaged with only a 45° rotational movement.

The nozzle assemblies 41 can be attached in any one of four angular positions that are 90° apart, allowing rectangular shaped nozzles 44 (FIGS. 15 & 16) and nozzles 44 designed for two sided components (FIG. 18) to be oriented correctly without reorienting the body portion B, which is of particular value in stationary apparatus.

The nozzle assemblies 41 locate themselves centrally with respect to the axis of the air tube T since the inclined surfaces 40c form a conical pilot on the mounting plate 40 that nests with the internal adapter body 16.

Spring-loading maintains the nozzle assembly 41 squarely against the face of the adapter assembly 10, so that, if the nozzle assembly 41 is bumped accidentally during positioning, it will restore itself accurately, and also, the nozzle positioning is not affected by thermal contraction and expansion.

The nozzle assembly 41 is retained in place under a consistent force whether hot or cold, thereby maintaining a smooth feel in attaching and detaching the nozzle assembly 41 under a wide range of conditions.

All nozzle assemblies 41 use the same mounting plate 40, so that a consistent engagement is achieved between the nozzle assemblies 41 and the adapter assembly 10, and this mounting plate 40 can be produced as a stamped and formed part which is relatively easy to manufacture accurately.

From the foregoing, it should now be apparent how the present invention enables interchangeable mounting of various different nozzles to apparatus which use a flow of hot air to re-melt solder for retaining or detaching electronic components to/from a substrate, such as a circuit board, for repairing, reworking and/or production thereof, and does so in a manner that is applicable to both stationary and hand-held heat applying units, and in a manner that can be easily and economically produced. Furthermore, it should also be apparent that the present invention is suitable for interchangeably mounting various different nozzles to apparatus of the noted type in a way that is not only easy to use, but also assures proper positioning of the nozzles relative to the end of the soldering/desoldering device, and thus, with reference to the component on which work is being performed.

While a single embodiment in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. A hot air solder reflow apparatus for repairing, reworking or producing electronic components and circuit boards of the type having a means for supplying a flow of hot air to an outlet tube and an adaptor assembly for interchangably mounting each of a plurality of different hot air nozzles to the end of said outlet tube; wherein said adaptor assembly comprises a outer support collar, a bezel ring mounted in the support collar, said bezel ring having a plurality of receiving tabs, an internal adaptor body which carries the support collar, a spring resiliently holding the support collar in an axial direction relative to the internal body; and wherein each of the nozzles is part of a respective nozzle assembly having a mounting plate with mounting tabs; wherein the mounting tabs on the mounting plate of each nozzle assembly is receivable between the receiving tabs of the bezel ring and an end surface of the internal adaptor body in a manner causing compression of the spring and a clamping action of the mounting plate between the end surface of the internal body and said bezel ring.

2. A hot air solder reflow apparatus according to claim 1, wherein the apparatus has a hand-holdable body portion from which said outlet tube extends.

3. A hot air solder reflow apparatus according to claim 2, wherein a ring clamp is attached to said internal adaptor body as a means for attachment of the adaptor assembly to said outlet tube.

4. A hot air solder reflow apparatus according to claim 1, wherein the apparatus has a body portion which is attached to a stationary pedestal, said outlet tube extending from said body portion.

5. A hot air solder reflow apparatus according to claim 4, wherein a ring clamp is attached to said internal adaptor body as a means for attachment of the adaptor assembly to said outlet tube.

6. A hot air solder reflow apparatus according to claim 1, wherein the mounting plates of all of the nozzle assemblies are the same, and have a conical pilot for engaging an inner perimeter of the internal adapter body and centering the mounting plate relative to the internal adapter body.

7. A hot air solder reflow apparatus according to claim 4, wherein conical pilot is formed by a plurality of inclined surfaces.

8. A hot air solder reflow apparatus according to claim 1, wherein each nozzle is connected to the respective mounting plate by an adaptor skirt.

9. A hot air solder reflow apparatus according to claim 1, wherein the internal adapter body is keyed to the outer support collar by pins which are fixed to the outer support collar and extend radially into axially elongated slots in the internal adapter body in a manner enabling limited relative axial sliding of the internal adapter body with respect to the support collar; and wherein said is a wave spring that is held between a washer carried on the internal adapter body and a ring that is fixed in an upper end of the support collar, the wave spring acting to push the internal adapter body into the support collar until the pins are stopped by ends of the slots in the internal adapter body.

10. A hot air solder reflow apparatus according to claim 9, wherein the receiving tabs of the bezel ring are evenly spaced about an inner circumference thereof and have upper and lower free edges; and wherein the bezel ring is disposed within the outer supporting collar with the upper free edges of the receiving tabs in contact with an underside of the washer and with the lower free edges of the receiving tabs in contact with an inner flange of the supporting collar.

11. A hot air solder reflow apparatus according to claim 10, wherein the mounting tabs have ridges and the receiving tabs have matched depressions; wherein a radial locating detent is provided by the upper free ends of the receiving tabs engaging a side edge of the mounting tabs together with engaging of said ridges with said depressions on clamping of the nozzle assembly to the adapter assembly.

12. A hot air solder reflow apparatus according to claim 1, wherein the mounting tabs have ridges and the receiving tabs have matched depressions; wherein a radial locating detent is provided by the upper free ends of the receiving tabs engaging a side edge of the mounting tabs together with engaging of said ridges with said depressions on clamping of the nozzle assembly to the adapter assembly.

* * * * *